SIGNAL PHASE-CORRECTING SYSTEM

Filed Feb. 13, 1953 3 Sheets-Sheet 1

INVENTORS
NORMAN A. HASSLER
HARRY R. JURMAN
CAESAR F. FRAGOLA
BY
C. V. Craddock
ATTORNEY Jan. 1, 1957 N. A. HASSLER ET AL 2,776,428

SIGNAL PHASE-CORRECTING SYSTEM

Filed Feb. 13, 1953 3 Sheets-Sheet 2

INVENTORS
NORMAN A. HASSLER
HARRY R. JURMAN
CAESAR F. FRAGOLA
BY
[signature]
ATTORNEY

SIGNAL PHASE-CORRECTING SYSTEM

Filed Feb. 13, 1953 3 Sheets-Sheet 3

INVENTORS
NORMAN A. HASSLER
HARRY R. JURMAN
CAESAR F. FRAGOLA
BY R. J. Craddock
ATTORNEY 2,776,428

SIGNAL PHASE-CORRECTING SYSTEM

Norman A. Hassler, Port Washington, Harry R. Jurman, Floral Park, and Caesar F. Fragola, East Hempstead, N. Y., assignors to Sperry Rand Corporation, a corporation of Delaware Application February 13, 1953, Serial No. 336,668

29 Claims. (Cl. 343—107)

Figure 1:
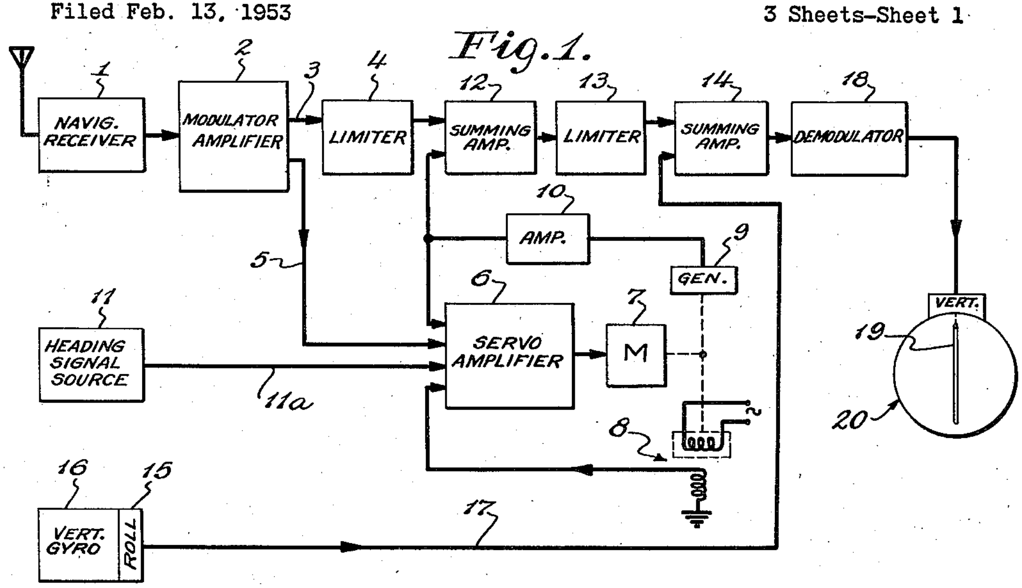

This invention relates to improvements in signal-responsive systems, and is more particularly concerned with a system for providing a smooth signal proportional to a time derivative of a noisy or randomly fluctuating signal wherein novel means are employed for providing that the smooth derivative signal has substantially the proper leading phase relation to said noisy signal. The novel means employed, however, is not limited to improving the phase relationship of the smooth derivative signal and the noisy signal, but is capable also of providing that a smooth version of the noisy signal is maintained substantially in phase with said noisy signal.

The invention also relates to improvements in aircraft navigational aids or systems of the type depending for control on the algebraic sum of signals proportional both to the displacement of the craft from a given flight path and a time derivative thereof, wherein a smooth derivative signal is obtained by differentiating the displacement signal, and means are employed including a source of signal having substantially the same phase, system-wise, as said derivative signal for improving the phase of the derivative signal before it is algebraically summed with others whereby to provide for effective control. As a matter of fact, not only may a source of signal of substantially the same phase be employed for improving the phase of the derivative signal, but any signal having a leading phase in relation to the derivative signal may be used to improve said derivative signal.

It will be understood that whenever the term "phase" is employed herein it is the system phase that is meant. For example, in a servo system where a signal is provided to represent the rate of change of the displacement of an object from a desired condition, such a rate signal is said to have a leading phase, system-wise, relative to the phase of a signal representing the displacement itself. By the same token, a signal representing the rate of the rate of change of the displacement, i. e., displacement acceleration, is said to have a leading phase, system-wise, relative to the phase of the signal representing the displacement rate. In fact, a pure rate signal leads its displacement signal in phase by 90°, and a pure acceleration signal leads said displacement signal by 180° and the rate signal by 90°. Hence, where a system is designed to use a displacement signal and a time derivative thereof, such as rate or acceleration, or both, the derivative signal is useful as such to a maximum degree only when it has the proper leading phase in relation to the displacement signal. In other words, the usefulness of the derivative signal decreases as its phase lead becomes increasingly less than the prescribed amount thereof.

In dealing with a randomly fluctuating or noisy control signal, it is often necessary to employ a considerable amount of filtering or smoothing in order appreciably to increase the utility of such control signal. This is especially true when it is desired to take the rate of change or other time derivative of the signal for control purposes, since the differentiation process serves in effect to amplify and otherwise unduly emphasize the noise present in the control signal. But by smoothing or filtering a noisy signal to make the differentiation thereof feasible, delays are thereby introduced such that the phase of the smoothed version of the input lags that of the noisy version. Therefore, in the absence of some means to overcome the phase lag accompanying smoothing, a time derivative taken of the smoothed signal will not have the proper leading phase relation to the noisy signal.

The present invention provides means for compensating for the lag brought about by the filtering of a noisy signal, so that, for example, a signal representing the rate taken of a smoothed version of the noisy signal has substantially a proper or leading phase quadrature relation with respect to the noisy signal itself.

In a preferred form of the invention, the foregoing compensation is accomplished by the addition to the noisy signal of a separate signal whose phase leads that of the noisy signal. By this expedient, the amount of the separate or lead signal is adjusted so that the combination thereof with the noisy signal will produce a resultant or net signal that substantially leads the noisy signal by the amount of lag anticipated as the result of the filtering or smoothing process. Therefore, when said leading resultant signal is filtered, a smooth output signal substantially in phase with and proportional to said noisy signal is thereby obtained.

In another form of the present invention, the lag due to filtering is compensated after the noisy signal input has first been filtered by adding to the resultant lagging signal a separate signal of leading phase relative to the noisy signal. In this fashion, the amount of separate or lead signal is adjusted so that the combination thereof with the lagging filtered signal will produce a resultant signal output substantially in phase with and proportional to the noisy signal input.

More particularly, the invention is shown embodied in a type of aircraft navigation system which utilizes control signals proportional to displacements of the craft from a given flight path. Where these displacement signals are of a noisy or randomly fluctuating character, such as those obtained, for example, from conventional radio navigation and glide-slope receivers, said arrangements serve to render said displacement signals more useful and especially make it possible for higher displacement derivatives of improved phase characteristics to be taken for control purposes. Hence, smooth and substantially lag-free signals proportional in one instance to the rate of change of the craft's displacement from the given flight path and in another instance to the rate of said rate of change are derived from a displacement signal which would otherwise be unsuited for such derivations therefrom due to its noisy or randomly fluctuating character.

An object of our invention is to provide novel means for compensating at least to some extent for the phase lag produced in a signal by the filtering or smoothing thereof.

Another object is the provision of means for providing a smooth signal derived from a noisy signal and substantially proportional to a time derivative thereof, said smooth derivative signal having substantially the proper leading phase relative to said noisy signal.

Another object is to provide a navigational aid capable of controlling a dirigible craft to travel toward and along a predetermined path of travel with improved precision.

Another object is the provision of an aircraft navigational aid of the foregoing character comprising improved means inherently capable of effecting attitude corrections to cope with such conditions as wind-drift, different speeds, different loading conditions and the like which affect the attitude of the aircraft about its several axes.

Another object is to provide a navigational aid for dirigible craft wherein means are provided for compensating at least to some extent for the phase lag induced in a signal by the filtering thereof, said signal being a measure of the movement of the craft relative to a given path of travel.

Another object is the provision of an aircraft navigational aid comprising means for deriving at least one smooth and substantially phase-correct time derivative signal from a signal representing a measure of the movement of the craft relative to a given path of travel.

Another object is to provide improved means for limiting the magnitude of attitude deviations called for by a navigational aid of the foregoing character.

Another object is the provision of an improved arrangement for supplying a signal generally proportional to the acceleration of an aircraft laterally of a given flight path.

With the foregoing and still other objects in view, my invention includes the novel combinations and arrangements of elements described below and illustrated in the accompanying drawings, in which—

Figure 2:
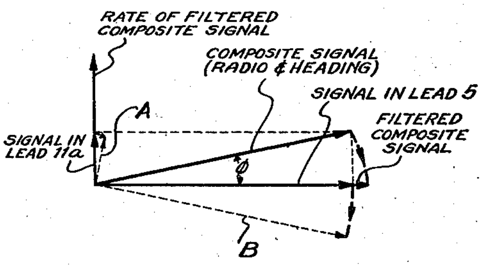
Figure 7:
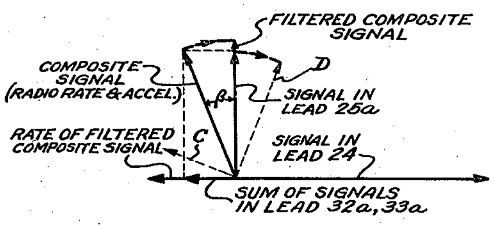
Figure 4:
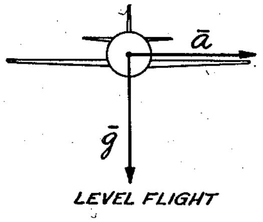
Figure 5:
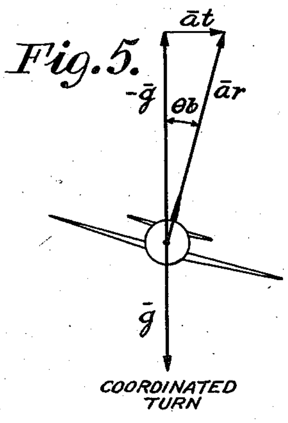
Figure 6:
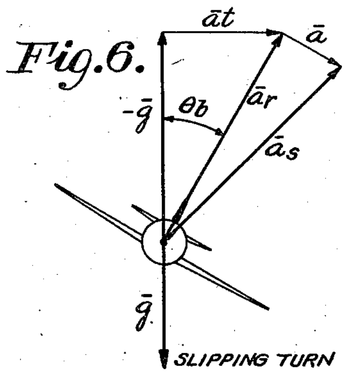
Figure 3:
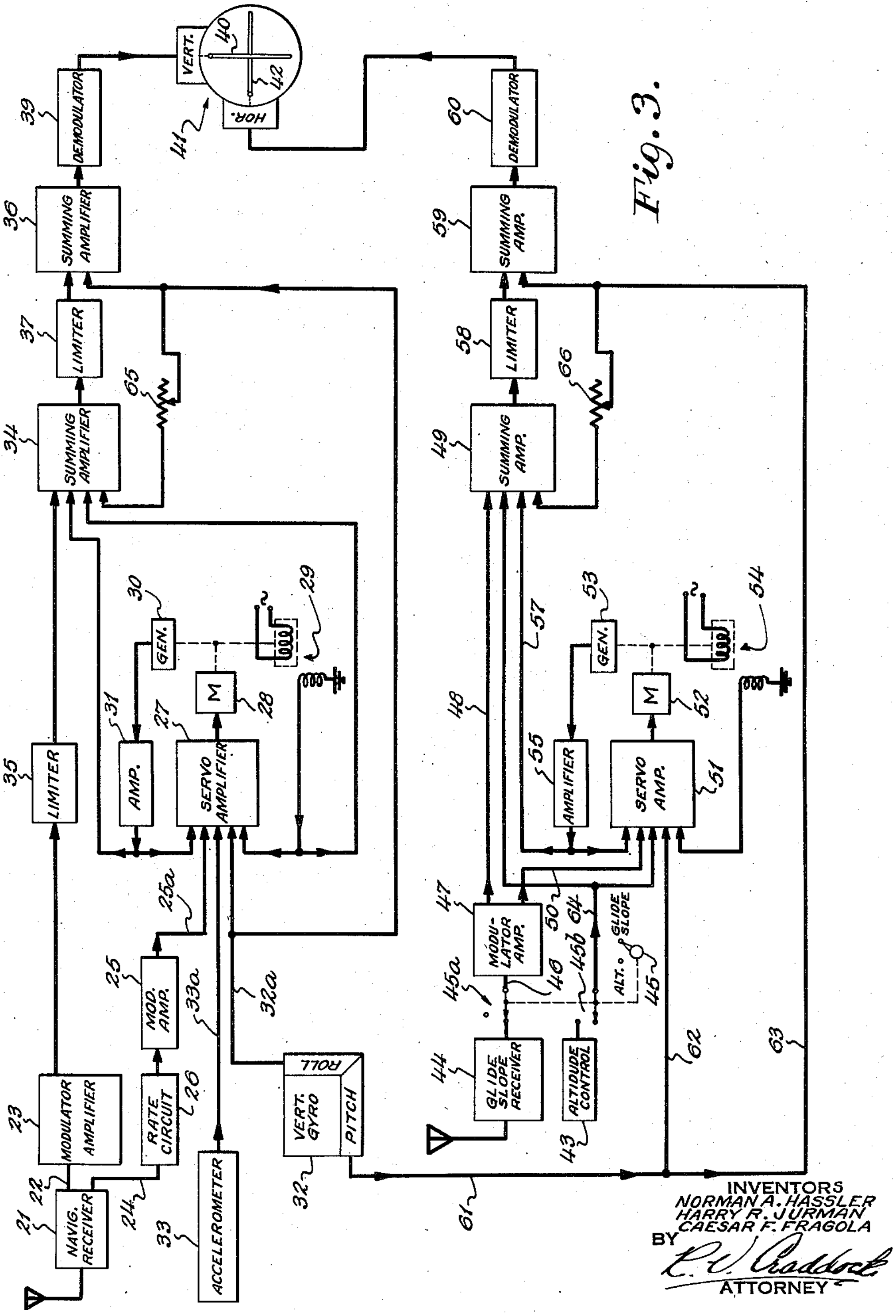

Figs. 1 and 3 are block diagrams serving to illustrate embodiments of the invention in navigational aids for aircraft;

Figs. 2 and 7, respectively, are vector diagrams which serve to illustrate in connection with Figs. 1 and 3 the phase lag effect of smoothing and the compensation of this effect by a signal of proper phase;

Figs. 4, 5, and 6, respectively, are vector diagrams showing the acceleration forces experienced by an aircraft in level flight, in a coordinated turn, and in a slipping turn.

Figures 8, 9, 10, 11, 12, 13, 14, 15, 16, 17, 18, 19:
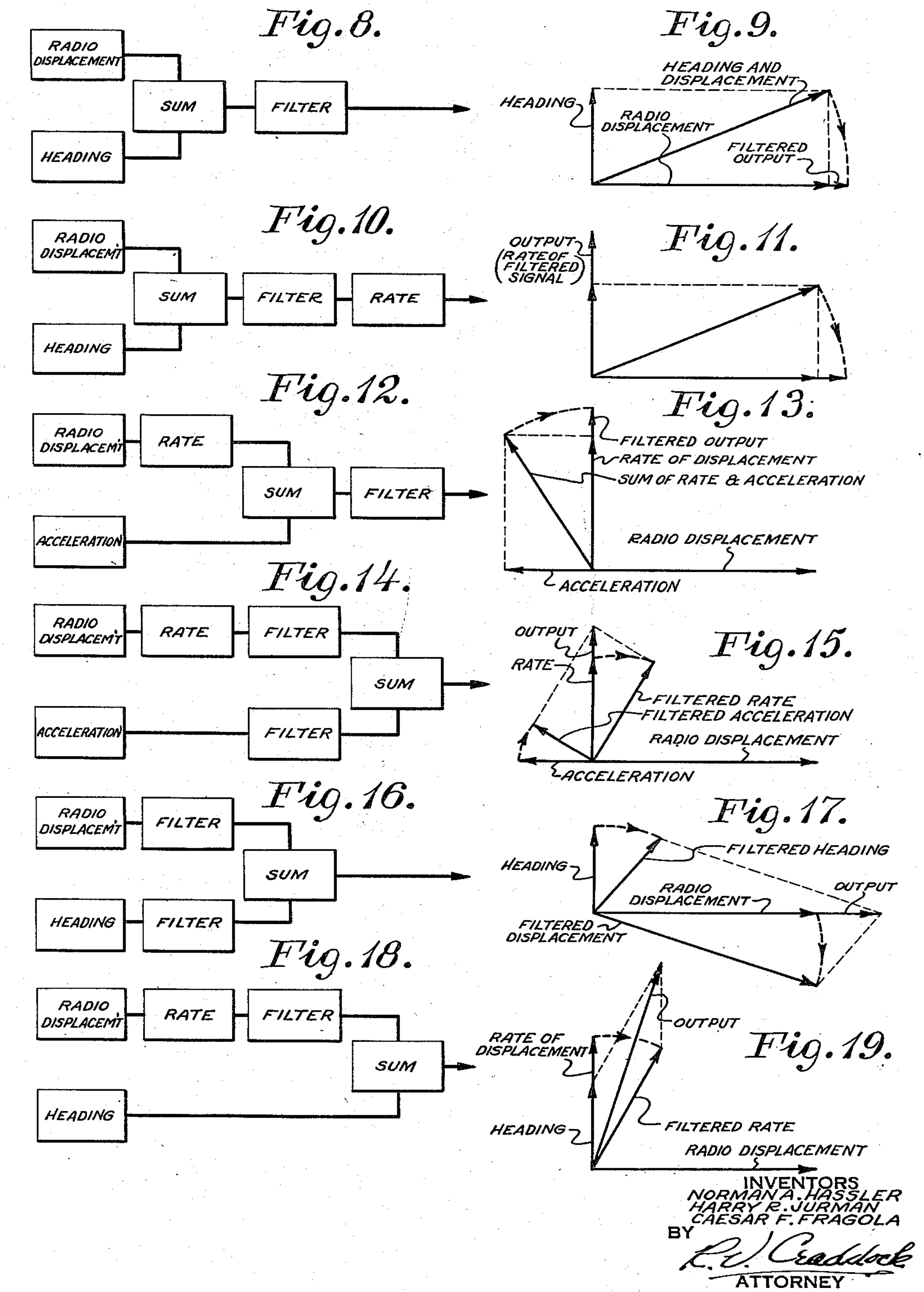

Figs. 8 and 9, respectively, show a simplified block diagram of one form of the invention and a vector diagram of the quantities involved in said form.

Figs. 10 and 11, 12 and 13, 14 and 15, 16 and 17, and 18 and 19 are pairs of figures which show simplified block diagrams of other forms of the invention and vector diagrams of the quantities involved in said other forms.

Briefly, the aforesaid type of navigation system wherein the present invention may be employed utilizes certain data such as signals proportional to displacement of an aircraft from a radio-defined path and signals proportional to the rate of change and acceleration of said displacement. The system functions as a computer to compute the dynamic equation of craft motion, and employs the foregoing signals as instantaneous values of the terms of the equation, providing an output which then serves to provide an indication to the pilot of the correct attitude of the craft to satisfy such equation at a particular instant. If the instantaneous solution of the equation is satisfied, all terms of the equation will ultimately be reduced to zero, thereby providing the correct navigation information for the craft. Stated in other words, the system herein used for exemplary purposes furnishes information to the pilot whereby he or it knows exactly how much correction in attitude of the craft should take place in order to cause the craft to approach asymptotically and thereafter maintain the desired flight path. A navigation system of the foregoing general character is fully described in U. S. Patent 2,613,352 issued October 7, 1952, in the name of Spencer Kellogg, 2nd, and assigned to the assignee of the present application.

In the foregoing patent, the control of the craft in a horizontal plane, for example, is governed by the algebraic combination of a radio-derived displacement signal with a heading error signal and a roll signal. The latter two signals are generally proportional to the displacement rate and displacement acceleration, respectively, and therefore may be used with a fair degree of success in lieu of rate and acceleration signals obtained, for instance, by differentiating radio displacement. However, under certain circumstances, improved performance may be obtained by using such derived rate and acceleration signals in lieu of heading error and roll signals, respectively. This is the case, for example, when the craft is flying along a localizer-defined flight path in preparation for a landing.

Due to the wedge-shaped pattern of radiation from the usual localizer transmitter, there is an effective increase in the sensitivity of the displacement signal received as the aircraft nears or closes the distance to said transmitter. Yet, the sensitivity of heading and roll signals remains unchanged, since these signals are completely independent of the distance between the craft and the localizer transmitter. On the other hand, the sensitivity of radio-derived cross-course rate and acceleration signals varies as an inverse function of the range of the craft from the transmitter. Therefore, on the craft approaching the transmitter, the ratio-derived signals will sense the movements of the aircraft with greater rapidity than the heading and roll counterparts thereof. It follows, then, that the aircraft control along the radio-defined path will be more precise and that the attitude changes required for the craft to keep on course will be considerably reduced in magnitude at this critical stage of flight.

Another advantage of the present invention lies in its ability automatically to effect a wind-drift correction such that the craft will be caused to fly the prescribed flight path with the requisite crab angle. This ability stems from the use of a rate signal which is derived from the horizontal displacement signal instead of being synthetically obtained, so to speak, from a source of heading signal as in prior art systems. By the same token, use of a rate signal derived from the vertical displacement signal, instead of being synthetically obtained from a source of pitch signal, serves automatically to effect a pitch correction such that the craft will be caused to fly the prescribed flight path with the pitch trim required to cope with such conditions as aircraft loading and speed, as well as with the angle a glide-slope beam-defined path makes with the runway. Hence, it is seen that the use of rate signals derived from displacement signals permits the navigational aid to call for the heading or pitch trim required to cope with conditions such as those mentioned so as to keep the craft centered on the given flight path.

In Fig. 1, a conventional radio navigation receiver 1, such as a receiver capable of receiving standard ILS localizer signals or VOR signals or the like, provides a direct-current signal proportional to the displacement of the craft horizontally of a radio-defined flight path. This signal is modulated and amplified in a suitable modulator amplifier 2 from which it is fed via a lead 3 to a conventional signal limiter device 4 and via a lead 5 to a servo-amplifier 6. Limiter 4 is provided to prevent displacement error signals from obtaining complete control of the system when the displacement of the craft from the radio-defined path is large; and the limit imposed serves to determine the intercept angle the craft makes with said radio-defined path. Servo-amplifier 6 is a conventional feedback-amplifier mixer such as is described, for example, on pp. 99, 100 of vol. 18 (Vacuum Tube Amplifiers) of the M. I. T. Radiation Laboratory Series (McGraw-Hill).

Servo-amplifier 6 forms part of a follow-up type of servomechanism, and in this regard is electrically connected to energize a motor 7 having a shaft connected via suitable gearing to rotate the rotor of a selsyn-like transformer device 8 preferably of the kind having an A.-C. output which varies linearly with respect to angular rotor displacement.

The stator of transformer 8 is electrically connected in follow-up relation to the servo-amplifier to insure that motor 7 is driven in accordance with the localizer-derived displacement input. The shaft of motor 7 is also connected by suitable gearing to drive a tachometer-type generator 9 which produces an A.-C. signal proportional to the time rate of change of the output of the servo-amplifier. An amplifier 10 is preferably connected to receive this tachometric or rate signal for amplification and feed it in negative feedback fashion to the servo-amplifier whereby the rate signal feedback serves to smooth or filter the output of said servo-amplifier in a well-known manner. However, by virtue of being smoothed, the output of the servo-amplifier is made to lag the signal input insofar as the phase relationship of these signals is concerned.

Therefore, since the tachometer signal represents the time rate of change of the servo-amplifier output, it cannot also represent the time rate of change of the servo-amplifier input, due to the phase difference therebetween, unless some means is provided to compensate for the phase lag brought about by the tachometric feedback-induced smoothing. The present invention provides such compensation by employing means whereby a source of leading signal is connected in input fashion to servo-amplifier 6 to feed a relatively small amount of said leading signal thereto. That is to say, a signal whose phase leads that of the displacement input is mixed with or added to said input in the servo-amplifier.

A satisfactory lead signal for the foregoing compensation of lag in the output of servo-amplifier 6 may be obtained from a heading signal source 11 which is capable of furnishing a signal to amplifier 6 via lead 11*a* proportional to the angular difference or error between the direction of the craft and the direction of the radio-defined flight path. Such a source may comprise a slaved directional gyroscope and a heading selector as fully described in the aforesaid Patent Number 2,613,352. Compensation by this signal is possible since such heading difference signal is generally proportional to the rate of change of the radio displacement error, and, therefore, is substantially in leading phase quadrature with the displacement signal input to servo-amplifier 6.

The basis for the assumption thus far entertained, that lag compensation is brought about by the addition of a small amount of leading signal (such as a heading error signal) to a signal (such as a noisy displacement error signal) undergoing smoothing, will be readily understood by referring to Fig. 2.

In Fig. 2 is illustrated a vector representation of the radio displacement signal in lead 5 with the compensatory or heading error signal in lead 11*a* leading said displacement signal by a phase angle of 90°. The resultant or vector sum of the two signals is seen to lead the displacement signal by an angle $\phi$. If said vector sum is filtered to the extent that the lag produced by filtering is made to equal the lead angle $\phi$, then the phase of the filtered composite or sum signal will be made the same as that of the noisy displacement signal. Therefore, a signal representing the rate of change of the filtered composite signal has the proper or leading quadrature phase relation to the noisy displacement signal, thereby serving as a phase-correct measure of the rate of said displacement signal.

On the other hand, as shown by the dotted lines, without the addition of the heading signal in lead 11*a* to the radio displacement signal in lead 5, the filtering of the latter would result in a phase lag such that a rate A taken of the lagging signal B would not be in quadrature with said radio displacement signal. Hence, this uncompensated rate signal A would have components both in phase with radio displacement and 90° out of phase therewith, whereby the in-phase component would add to radio displacement and make it appear that the magnitude of the latter is greater than it actually is.

Returning to Fig. 1, the tachometer feedback signal represents the compensated rate of change of the radio displacement input to servo-amplifier 6; and, besides being fed back to said servo-amplifier, the rate signal is fed to a conventional summing amplifier 12 where it is algebraically added to the radio displacement signal emerging from limiter 4. The sum signal output of amplifier 12 is then fed via a second conventional limiter device 13 to another summing amplifier 14. In amplifier 14, the signal representing the sum of displacement and displacement rate is then algebraically combined with a signal representing displacement acceleration or rate of change of displacement rate. Limiter 13 serves to limit the sum of the displacement and displacement rate signals before such sum is algebraically added to the displacement acceleration signal so that no more than a given maximum amount of roll will be called for to equate the sum of the three signals to zero.

The acceleration signal may be furnished by a roll pickoff 15 associated with a conventional vertical gyroscope 16, since the roll attitude of an aircraft is generally proportional to the rate of change of displacement rate. Hence, the roll signal output of pickoff 15 is shown as being fed via a lead 17 to amplifier 14. The output of amplifier 14, representing the algebraic sum of displacement, displacement rate and displacement acceleration, is then demodulated in a suitable demodulator 18 whence it is fed in controlling relation to the vertical needle 19 of an indicator 20 which may be a standard cross-pointer meter or the like.

By controlling his craft to keep the algebraic sum of the foregoing terms at zero, the pilot will cause said craft to fly asymptotically toward the radio-defined flight path and thereafter fly along the same.

It will be noted that the arrangement shown in Fig. 1 produces a radio-derived rate signal, but that the acceleration signal, instead of also being radio-derived, is provided in the form of a roll signal obtained from pickoff 15 of gyroscope 16. While improved precision of control may be had with the system of Fig. 1 over prior art navigation aids of the general character described, still better precision, however, may be obtained in a system wherein the rate and the acceleration signals, both, are radio-derived. A preferred embodiment of the present invention, therefore, incorporates the latter feature; and said embodiment will hereinafter be described in connection with a diagrammatic representation thereof in Fig. 3.

In Fig. 3, a conventional navigation receiver 21, of the same type as receiver 1 in Fig. 1, provides a direct-current signal proportional to the displacement of the craft horizontally of a radio-defined flight path. This signal is fed by a lead 22 to a conventional modulator-amplifier 23, and is also fed by a lead 24 to a rate-taking circuit 26 which may, for example, be of the well-known resistance-capacitance network type. The signal output of circuit 26, therefore, is substantially proportional to the rate of change of the radio displacement signal. But, assuming the radio displacement signal to be noisy, as it invariably is, the rate output of circuit 26 will be noisier to a still higher degree due to the preferential amplification property of differentiators toward high-frequency signal components.

Ordinarily, the low signal-to-noise ratio of a rate signal so obtained would preclude the use of the signal for control purposes. However, by the present invention, a noisy rate signal such as that obtained from circuit 26 may be smoothed, and its leading phase quadrature relation to the displacement signal from which it is derived may be preserved, notwithstanding the lagging effect produced by smoothing.

In this regard, the output of rate circuit 26 is fed via a conventional modulator-amplifier 25 and a lead 25*a* to a suitable servo-amplifier 27 forming a part of a follow-up type of servomechanism similar to that shown in Fig. 1, amplifier 27 being a conventional feedback-amplifier mixer of the same type as servo-amplifier 6. Accordingly, amplifier 27 is electrically connected to energize a motor 28 having a shaft connected via suitable gearing to rotate the rotor of a selsyn-like transformer device 29 preferably of the kind having an A.-C. output which varies linearly with respect to angular rotor displacement.

The stator of transformer 29 is electrically connected in follow-up relation to the servo-amplifier to insure that motor 28 is driven in accordance with the output of rate circuit 26. The shaft of motor 28 is also connected by suitable gearing to drive a tachometer-type generator 30 which produces an A.-C. signal proportional to the time rate of change of the output of the servo-amplifier. An amplifier 31 is preferably connected to receive this tachometric signal and feed it in negative feedback fashion to the servo-amplifier whereby the amplified tachometric feedback serves to smooth or filter the output of said servo-amplifier in a well-known manner. However, by virtue of being smoothed, the output of the servo-amplifier is made to lag the signal input insofar as the phase relationship of these signals is concerned.

In order to compensate for this lag so that the signal output of servo-amplifier 27 represents a lag-free smoothed version of the amplifier input, i. e., represents a lag-free smoothed version of the rate output of rate circuit 26, essentially the same general mode of compensation is employed as was discussed hereinbefore in connection with Fig. 1. That is to say, a signal having a leading phase with respect to the noisy rate input of servo-amplifier 27 is added to said input such that the phase lag that would otherwise be produced by filtering is substantially exactly offset by the phase lead of the vector sum of the lead signal and the noisy rate input.

A lead signal for the foregoing compensation of lag in the rate output of servo-amplifier 27 may be obtained from a signal-generating inertial device which may be an accelerometer means or the like suitably adapted to respond to the accelerations of the craft toward the radio-defined flight path. But, the use of an accelerometer would normally require it to be "stabilized," i. e., mounted on a platform which maintains its position in space independently of the attitude changes of the craft. It has been found, however, that a mounting of such complexity may be avoided without serious detriment provided that roll signals from means such as a roll pickoff equipped vertical gyroscope 32 are fed to amplifier 27 (via a lead 32*a*) for use in combination with acceleration signals fed (via a lead 33*a*) from a conventional signal-generating accelerometer means 33 rigidly mounted on the craft to respond to accelerations along the lateral or athwartships axis of said craft. The validity of this contention will become clear by referring to Figs. 4, 5, and 6 wherein an aircraft is diagrammatically shown in three different maneuvers: level flight, a coordinated turn, and a slipping turn.

With the level flight configuration shown in Fig. 4, the navigational system requires no second derivative term unless some side acceleration such as $\bar{a}$ exists. In that event, said side aceleration is not sensed by the vertical gyroscope 32, but by the rigidly mounted accelerometer 33 or by an accelerometer stabilized in space.

The coordinated turn shown in Fig. 5 results in a lateral turning acceleration $\bar{a}_t$ which is accompanied by a particular roll angle $\theta_b$ detected by the vertical gyroscope. But, since no acceleration now acts along the line of the aircraft's wing, the rigidly mounted accelerometer yields no output. Hence, in this case a pickoff on the vertical gyroscope would provide an accurate measure of this turning acceleration, as would, again, a stabilized accelerometer.

In a slipping turn, as indicated in Fig. 6, the resultant acceleration $\bar{a}_s$ can be resolved into components $\bar{a}_r$, normal to the wings and $\bar{a}$ parallel to the wings. That portion of $\bar{a}_s$ causing turning, namely $\bar{a}_t$, would be sensed as a roll angle $\theta_b$ by vertical gyroscope 32, while $\bar{a}$ would be sensed by the accelerometer. Therefore, the sum of the roll signal from vertical gyroscope 32 and the lateral acceleration signal from accelerometer 33 substantially represents the acceleration of the craft toward the radio-defined flight path. This being the case, the sum signal will be substantially in leading phase quadrature with the noisy rate signal, or have a phase lead of 180° relative to the radio displacement signal. It will be noted, however, that this method of measuring sideslip becomes progressively more inaccurate with increasing bank angles, since the true slip acceleration is the horizontal component of $\bar{a}$. Yet, it can be shown that up to roll angles as large as 30°, the accuracy of slip (or skid) measurement is not affected by more than 15%.

Referring to Fig. 7, it will be seen how lag compensation in Fig. 3 is brought about by the addition in servo-amplifier 27 of the foregoing combined roll and lateral acceleration signals in leads 32*a* and 33*a*, respectively, to the noisy rate signal from rate circuit 26. In Fig. 7 is illustrated a vector representation of the radio displacement signal in lead 24 with its noisy rate in lead 25*a* in leading phase quadrature therewith. The compensating signal formed by the summation in amplifier 27 of the roll and acceleration signals in leads 32*a*, 33*a*, leads the displacement signal by 180°, and is combined with the noisy rate signal to form a composite signal which leads said rate signal by a phase angle $\beta$. By selecting the proper amount of tachometer feedback, the composite signal may be filtered to the extent that the lag produced by filtering is made to equal the lead angle $\beta$. In that event, the phase of the filtered composite signal will be made the same as that of the noisy radio rate signal. Therefore, a signal representing the rate of change of the filtered composite signal, i. e., the displacement acceleration, has the proper or 180° leading phase relation to the radio displacement signal.

On the other hand, as shown by the dotted lines, without the addition of the displacement acceleration signal to the radio rate signal, the filtering of the latter would result in a phase lag such that a rate C taken of the lagging signal D would be of a phase somewhat less than the 180° leading phase desired with respect to the radio displacement signal. Hence, this uncompensated rate of rate or acceleration signal C would have components both in phase with radio rate and 90° out of phase therewith, whereby the in-phase component would add to radio rate and make it appear that the magnitude of the latter is greater than it actually is. Moreover, the filtered but uncompensated radio rate signal D would have in-phase and 90° out of phase components with respect to radio displacement, so that it would appear that radio displacement is also larger than it actually is.

Returning to Fig. 3, the follow-up signal from the stator of transformer 29 represents a lag-free smoothed version of the noisy rate input to servo-amplifier 27; and, besides its follow-up connection to the servo-amplifier, said smoothed radio rate signal is connected in input fashion to a conventional summing amplifier 34. At the same time, the amplified feedback signal from tachometer 30 represents a lag-free smoothed version of the rate of the noisy rate input to servo-amplifier 27; and besides its feedback connection to the servo-amplifier, this radio acceleration signal is connected, like the rate signal, in input fashion to summing amplifier 34. From modulator-amplifier 23, the radio displacement signal is fed via a conventional signal limiter device 35 (of the same type as the limiter 4 hereinbefore described in connection with Fig. 1) as a third input to summing amplifier 34 wherein said displacement signal is algebraically added to the signals representing its rate of change and acceleration.

By controlling the attitude of his craft to maintain the algebraic sum of the foregoing signals equal to zero, the pilot will cause said craft to fly asymptotically toward the radio-defined flight path and thereafter fly along the same.

In order to insure that no more than a given maximum roll attitude will be called for to equate the algebraic sum of the three signals to zero, a signal representing a direct measure of roll attitude is supplied both as a fourth input to summing amplifier 34 and as an input to another summing amplifier 36, the latter amplifier also being connected to receive the output of amplifier 34 via a conventional limiter device 37. The level of the roll signal entering amplifier 36 via limiter 37 is adjusted by a suitable attenuating device 65 precisely to match the level of the roll signal that by-passes said limiter and directly enters said amplifier. Moreover, amplifier 34 and limiter 37 are such as preferably to effect a single phase reversal of the roll signal passing therethrough. The roll signal is readily obtained from the pickoff means hereinbefore set forth as being mounted on the roll axis of vertical gyroscope 32, and is fed therefrom via a lead 38 to the amplifiers 34, 36. Amplifier 36 is connected via a suitable demodulator means 39 to feed its output in controlling relation to the vertical needle 40 of an indicator 41 substantially identical to indicator 20 of Fig. 1.

By the foregoing arrangement, the gyroscopically-obtained roll signals introduced before and after limiter 37 tend to cancel each other in amplifier 36 due to the single phase reversal occurring in amplifier 34 and the equality in magnitudes of said signals. The cancellation is complete and any direct sensing of roll attitude is nullified so long as the sum output of amplifier 34 does not exceed the limit value imposed by limiter 37. Since the craft is normally controlled so as to make the algebraic sum of the radio displacement, rate and acceleration terms equal to zero, the sum output of amplifier 34 is normally proportional to the roll attitude input thereto. Hence, in limiting the sum output of amplifier 34, limiter 37 effectively limits one of the two roll signals entering amplifier 36. Therefore, when the roll signal fed to amplifier 34 exceeds the limit imposed by limiter 37, said roll signal will be insufficient completely to buck out the unlimited roll signal received directly at amplifier 36. In that event, a signal representing the difference between the actual value of the roll signal and the value to which said roll signal is limited is fed in controlling relation to vertical needle 40 of indicator 41, thereby to deflect the needle so as to call for a decrease in roll attitude at least to that attitude corresponding to the roll limit imparted by limiter 37.

The horizontal needle 42 of indicator 41 is preferably controlled in accordance with the algebraic sum of signals representing the displacement of the craft vertically of a given flight path and the rate of change of said displacement. Said flight path may be a given altitude; in which event, the displacement signal may be provided by a conventional signal-generating altimeter 43. On the other hand, the flight path may be defined by a radio beam such as that transmitted by a standard ILS glide-slope transmitter; in which event, the displacement signal may be provided by a conventional glide-slope receiver 44.

In order that the radio-derived and altimeter-derived displacement signals may be used in the alternative, a switch having a set of contacts 45*a* and a set of contacts 45*b* is provided along with a two-position knob 45 suitably adapted simultaneously to close one set and open the other set of said contacts.

When contacts 45*a* are closed, the glide-slope displacement signal is fed via a lead 46 to a suitable modulator-amplifier 47 from which the signal is then fed via a lead 48 to a summing amplifier 49 and via a lead 50 to a servo-amplifier 51. Servo-amplifier 51 is a conventional feedback-amplifier mixer of the same type as servo-amplifier 6, and it forms part of a follow-up type of servomechanism substantially identical in structure and general purpose to the servomechanism of which servo-amplifier 6 (Fig. 1) forms part. In other words, a motor 52 corresponds to motor 7, a tachometer generator 53 to tachometer generator 9, a synchro transformer 54 to transformer 8, and an amplifier 55 to amplifier 10. The lag-compensating signal in this instance represents deviations of the craft in pitch attitude, and is provided via leads 61, 62 by conventional electrical pickoff means suitably mounted on the pitch axis of vertical gyroscope 32.

By the foregoing arrangement, the tachometric feedback signal for servo-amplifier 51 is made to represent a smoothed lag-free version of the rate of change of the radio displacement signal. Moreover, besides being employed for feedback purposes, this rate signal is fed via a lead 57 to summing amplifier 49 which is substantially identical to summing amplifier 34 in the vertical needle control portion of Fig. 3. The output of amplifier 49 is then fed to a limiter device 58, thence to a summing amplifier 59 whose output is connected in controlling relation to horizontal needle 42 via a suitable demodulator means 60. Limiter 58 and summing amplifier 59 are substantially identical to the limiter 37 and amplifier 36 in said vertical needle control portion of Fig. 3. Moreover, amplifier 49, limiter 58, and amplifier 59 are connected in the same manner as their aforesaid counterparts; however, instead of algebraically summing horizontal displacement, rate, and acceleration signals and imparting a limit to the roll attitude of the craft, said elements are used to algebraically sum vertical displacement and rate signals and impart a limit to the pitch attitude of the craft.

In this regard, therefore, a signal representing a direct measure of the pitch attitude of the craft is fed via leads 61, 63 to amplifier 49 before limiter 58 and to amplifier 59 after the limiter, the level of the pitch signal entering amplifier 59 via amplifier 49 and limiter 58 being substantially precisely matched by means of a suitable attenuator device 66 to the level of the pitch signal entering amplifier 59 directly. Hence, as with roll limiting, the gyroscopically-obtained pitch signals introduced before and after limiter 58 tend by virtue of opposite phase and equal magnitudes to cancel each other in amplifier 59 until the pitch attitude error of the craft exceeds the limit placed thereon. Whereupon, a signal representing the difference between the actual value of the pitch signal and the value to which said pitch signal is limited is fed to control horizontal needle 42, thereby to deflect the needle so as to call for a decrease in pitch attitude error at least to that attitude error corresponding to the pitch limit imparted by limiter 58.

When contacts 45*b* are closed and, therefore, contacts 45*a* are open, the altitude displacement signal is substituted for the glide-slope displacement signal, and is fed via a lead 64 to servo-amplifier 51 and summing amplifier 49. By this arrangement, summing amplifier 49 is made to receive the altitude displacement signal plus a signal representing a lag-free smoothed version of the rate of change of altitude. Pitch signals are brought into amplifiers 49, 59 as before, and again in conjunction with limiter 58 serve to limit the pitch attitude called for by horizontal needle 42. By controlling the craft to maintain the deflection of said needle at a zero value, the pilot will cause the craft to intercept and thereafter fly along a flight path of constant altitude, the direction of said flight path being substantially parallel to the ground.

It will be understood that the system described in Fig. 3 for control of vertical needle 40 may also be employed, with appropriate signal substitutions, for control of horizontal needle 42. That is to say, a signal proportional to the rate of change of the displacement signal from ILS radio receiver 44 or altimeter 43 may be obtained from a rate-taking network substantially identical to circuit 26, and may be subsequently smoothed by tachometric feedback in a servomechanism similar to mechanism 27—31. Compensation for lag due to smoothing may be effected by a signal proportional to the vertical acceleration of the craft and obtained from an appropriately mounted signal-generating accelerometer similar to accelerometer 33. By this arrangement, the position feedback signal of the servomechanism may be made to represent a smooth lag-free verision of the rate of change of the displacement signal, and may be algebraically combined with said displacement signal in amplifier 49 as is the rate signal otherwise obtained in Fig. 3. It will be apparent that the tachometer feedback signal, at the same time, represents a smooth lag-free displacement acceleration signal and may also be algebraically combined with the displacement and displacement rate signals.

In Figs. 1 and 3 several forms of the present invention have been shown for exemplary purposes; however, in order more fully to illustrate the scope of the invention, a number of simplified block diagrams have been included herein, each with an accompanying vector diagram to facilitate a ready understanding of the particular form of the invention illustrated.

Figs. 8 and 9 constitute one such simplified block diagram and associated vector diagram, and show how the present invention may be employed in an aircraft to provide a smooth in-phase signal substantially proportional to a noisy displacement error signal. In Fig. 8, a heading error signal is added in a summing means to a noisy displacement error signal and the resultant signal is then fed to a filtering means for smoothing. In Fig. 9, these error signals are depicted as vectors and are shown with their proper quadrature phase relation. The sum of the heading and displacement signals is seen to be a signal having a leading phase with respect to the displacement error. Subsequent smoothing serves to lag the sum signal by an amount equal to the phase lead thereof such that the sum vector is rotated into phase with the displacement vector, thereby to provide the desired smooth and phase-correct version of the displacement error signal.

The foregoing smooth and phase-correct displacement error signal may then be fed to a rate-taking means, as shown in Fig. 10, to obtain a rate signal in leading phase quadrature with the signal representing the displacement error, as shown in Fig. 11. This alternative form is essentially the heading-compensated rate arrangement illustrated in greater detail in Fig. 1.

Figs. 12 and 13 serve to describe another alternative form of the present invention, which form is adapted to provide a smooth in-phase signal substantially proportional to the rate of a noisy displacement error signal. In Fig. 12, a noisy displacement error signal is fed to a rate-taking means and the rate signal thereby obtained is fed to a summing means wherein it is combined with a signal obtained from a source independent of the displacement signal, said independently-obtained signal being generally a measure of the cross-course acceleration of the craft. The resultant signal is then fed to a filtering means for smoothing.

In Fig. 13, the noisy rate signal vector is shown with its leading quadrature phase relation to the noisy displacement signal vector; and the independently-obtained acceleration signal is depicted with its leading quadrature phase relation to the noisy rate. The sum of the noisy rate and the acceleration signals is seen to be a signal having a leading phase with respect to said noisy rate. Subsequent smoothing serves to lag the sum signal by an amount equal to the phase lead thereof such that the sum vector is rotated into phase with the noisy rate vector, thereby to provide the desired smooth and phase-correct version of the displacement rate signal. This is essentially the means employed in Fig. 3 for obtaining a useful rate signal.

A rate of the foregoing smooth and phase-correct displacement rate may then be taken by suitable rate-taking means in the manner in which a rate signal was provided in Fig. 10. A showing of this form of the invention in greater detail is made in the acceleration-compensated rate arrangement also illustrated in Fig. 3.

Another alternative form of the invention is illustrated by means of Figs. 14 and 15. In this form, instead of the amount of filter-induced phase lag being anticipated and an equivalent amount of phase lead being given to the signal before the filtering thereof, the signal is first filtered and thereafter is given a lead to offset the lag caused by the filtering process. In Fig. 14, therefore, a noisy displacement error signal is fed to a rate-taking means, and the noisy rate signal that emerges therefrom is fed to a filter means. A summing means is then employed to combine the filtered rate signal with a signal generally approximating the cross-course acceleration of the craft, said signal being obtained from a source independent of the displacement signal. Preferably, said acceleration signal is also filtered, since it has been found that such filtering serves substantially to eliminate third derivative and yet higher derivative components from these signals.

The quadrature relation of the noisy displacement and rate signals described in connection with Fig. 14 is vectorially represented in Fig. 15, as well as the slightly less than quadrature relation of the noisy rate signal and the filtered independently-obtained acceleration signal. The filtering of the noisy rate signal produces a vector which is shown lagging said noisy rate, and the filtered acceleration vector is shown as being added to said lagging vector in order to rotate the same into phase with the noisy rate vector, thereby to provide the desired smooth and phase-correct version of the noisy rate signal.

It will be clear that once having the desired smooth and phase-correct version of the noisy rate signal, as obtained in Fig. 14, said desired signal may then be fed to a suitable rate-taking means for providing a smooth phase-correct signal proportional to the rate of the noisy rate signal, i. e., a smooth phase-correct acceleration signal.

Figs. 16 and 17 serve to disclose still another alternative form of the present invention, but which is similar to the form of Fig. 15 in that a compensating lead signal is introduced after filtering takes place. In Fig. 16, the arrangement is adapted to provide a smooth in-phase signal substantially proportional to a noisy displacement error signal. In this regard, a noisy displacement error signal is fed to a filter means, and the smooth signal that emerges therefrom is thereafter combined in a summing means with a heading signal. Preferably, the heading signal is also filtered, since it has been found that such filtering serves substantially to eliminate higher derivative components from the heading and displacement signals when they are added.

In vector diagram Fig. 17 for the arrangement of Fig. 16, a vector lagging the noisy displacement vector represents the filtered version of the noisy displacement signal, and a vector having slightly less than a quadrature phase lead with respect to said noisy displacement vector represents the filtered version of the heading signal. By adding the filtered heading vector to the filtered displacement vector, it is seen how the latter is rotated into phase with the noisy displacement vector, thereby to provide the desired smooth and phase-correct version of the noisy displacement signal.

In order to provide a smooth phase-correct rate signal in the arrangement of Fig. 16, it will be clear that one might connect a suitable rate-taking means to differentiate the smooth phase-correct displacement signal output of the summing means shown therein.

Yet another form of the present invention is set forth by means of Figs. 18 and 19. This form differs from any of the foregoing in that the phase of a noisy rate signal which is filtered is not sought fully to be compensated for filter-induced lag, but, rather, to be somewhat improved in lieu thereof. In Fig. 18, a noisy displacement signal is fed to a rate-taking means, and the noisy rate signal that emerges therefrom is fed to a filter means. A summing means is then employed to combine the filtered rate signal with a heading signal. Vector diagram Fig. 19 shows how the rate taken of the noisy displacement signal assumes a leading quadrature phase relation to the latter. It is seen that the filtered version of this rate has less than a 90° phase lead with respect to displacement, and that by adding a heading signal to the filtered rate, the lag is somewhat decreased but not fully removed. Nevertheless, it will be apparent that the rate output is improved in phase, i. e., it is closer to being a full 90° out of phase with displacement than it would be without any compensatory or lead signal added at all.

A phase-improved acceleration signal is readily obtained by differentiating the partially-compensated or phase-improved rate signal of Figs. 18 and 19 with suitable rate-taking means. By this expedient, the resulting acceleration signal is in phase quadrature with said phase-improved rate signal, and is therefore closer to being a full 180° out of phase with the displacement signal than would be the case without compensation by a lead signal of any sort in Fig. 18.

It is to be noted that the foregoing Figs. 8–19 have been described for exemplary purposes in terms representative of the approach, horizontally, of an aircraft toward a given flight path. The aforesaid figures, however, may be described equally as well in terms representative of the approach, vertically, of an aircraft toward a given flight path. That is to say, instead of the noisy displacement error signal being obtained from a radio localizer receiver or like navigation receiver means, it may be obtained from a glide-slope receiver or a signal-generating altimeter means. In this event, a pitch signal is employed for lag-compensation instead of a heading signal, and a vertical accelerometer signal may be used instead of a combined roll and lateral acceleration signal.

As a matter of fact, the said Figs. 8–19 are not at all intended to limit the invention to embodiments thereof in aircraft navigational aids. That is to say, the invention may be thought of in terms entirely divorced from navigational aids of any character. In this connection, for example, the displacement signal may represent the displacement of an object from any given condition, and the signal for counter-acting a filter-induced phase lag of said displacement signal may, in such event, be a signal, independently-obtained, which has substantially the same magnitude and phase characteristics as the rate of change of said displacement signal, or, alternatively, substantially the same magnitude and phase characteristics as the acceleration of said displacement signal.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a signal-responsive system for providing a smooth output signal which is both proportional to a noisy input signal and substantially in phase therewith, the combination comprising a source of signal of a noisy character, signal-smoothing means connected to receive said signal and adapted to provide in its output a smoothed version of the noisy signal, said signal-smoothing means effecting a predeterminable phase lag, and means for advancing the phase of the signal an amount sufficient to compensate at least to some extent for the lag produced by said signal-smoothing means.

2. In a signal-responsive system for providing a smooth output signal which is both proportional to a noisy input signal and substantially in phase therewith, the combination comprising a source of signal of a noisy character, signal-smoothing means connected to receive said signal and adapted to provide in its output a smoothed version of the noisy signal, said signal-smoothing means effecting a phase lag, and means independent of said source of signal for advancing the phase of the signal by an amount substantially equal to the amount of lag, whereby the lag due to the smoothing means and the lead due to the leading means are offset one by the other.

3. A signal-responsive system for providing smooth signal data substantially both in phase with and in proportion to noisy signal data of variable magnitude, said system comprising a source of variable first signal of a noisy character and of a given predominant phase, means independent of said source of first signal for providing a second signal substantially in leading phase quadrature with said first signal, means for combining said first and second signals to provide a third signal substantially proportional in magnitude to said first signal but of a phase which leads the phase of said first signal by a preselected amount, and means for smoothing said third signal, said smoothing means serving to lag the phase of said third signal by substantially the same amount as said preselected amount of lead, whereby said smoothed third signal is substantially both in phase with and in proportion to said first signal.

4. A signal-responsive system for improving the phase relation between signal data subject to random fluctuations and a time derivative of said signal data, said system comprising a source of first signal of a noisy character and of a given predominant phase, means for providing a second signal substantially in leading phase quadrature with the first signal, means for combining said first and second signals to provide a third signal substantially proportional in magnitude to said first signal but of a phase which leads the first signal by a preselected amount, means for smoothing the third signal, said smoothing means serving to lag the phase of the third signal by substantially the same amount as the lead thereof so as to provide a signal output that is substantially a smooth in-phase version of the first signal, and differentiating means connected to receive the signal output of the smoothing means for providing a fourth signal proportional to a time derivative of said smooth in-phase version of the first signal, whereby said derivative signal has substantially the proper leading phase with respect to said first signal.

5. A signal-responsive system for providing smooth signal data substantially both in phase with and in proportion to noisy signal data of variable magnitude, said system comprising a source of variable signal of a noisy character and of a given predominant phase, means for smoothing said noisy signal, said smoothing means serving to effect a lag in the phase of the noisy signal in a preselected amount, means independent of said source of noisy signal for providing a signal of a leading phase relative to the noisy signal, and means for combining the smoothed signal with the lead signal, the magnitude and phase lead of said lead signal being such that its combination with said smoothed signal results in a smooth output signal substantially both in phase with and in proportion to the noisy signal.

6. The signal-responsive system of claim 5 further including differentiating means connected to receive the smooth output signal for providing a signal proportional to the rate of change thereof.

7. A servomechanism including an amplifier having position and speed feedback, means connected to said amplifier including a radio receiver for providing a first input of a given phase, said first input being subject to random fluctuations about a variable mean value thereof, and means connected to said amplifier for providing a second input in phase quadrature with said first input, whereby said speed feedback serves to smooth said random fluctuations while being maintained by said second input substantially in phase quadrature with said first input.

8. A servomechanism including an amplifier and means adapted to provide position and speed feedback signals to said amplifier, first means connected to said amplifier for providing a first signal input thereto of a given phase, said first signal being subject to random fluctuations about a variable mean value thereof, and second means independent of said first means and connected to said amplifier for providing a second signal input thereto of a phase leading said given phase, the magnitudes of said second signal and said speed feedback signal being such that said speed feedback signal serves to smooth said random fluctuations while said second signal serves to maintain said speed feedback signal substantially in leading phase quadrature with respect to said first signal.

9. In a navigational aid for dirigible craft, means for supplying a signal which is a measure of the movement of the craft toward a predetermined path of travel, said signal-supplying means being of a character such that the signal supplied therefrom is of a noisy nature, signal-smoothing means connected to receive said signal and adapted to provide in its output a smoothed version of the noisy signal, said signal-smoothing means effecting a predeterminable phase lag, and means for advancing the phase of the signal an amount sufficient to compensate at least to some extent for the lag produced by said signal-smoothing means.

10. The navigational aid of claim 9 wherein the first-recited means comprises a radio receiver, and wherein the phase advancing means comprises gyroscopic means and a signal generator operated by said gyroscopic means.

11. In a navigational aid for dirigible craft, means for supplying a signal of a noisy character and substantially proportional to the displacement of the craft from a given path of travel, signal-smoothing means connected to receive said signal and adapted to provide in its output a smoothed version of the noisy signal, said signal-smoothing means effecting a preselected phase lag, and means independent of said noisy signal-supplying means for advancing the phase of the signal by an amount substantially the same as said preselected amount of lag, whereby the lag due to the smoothing means and the lead due to the leading means are substantially offset one by the other.

12. The navigational aid of claim 11, wherein the noisy signal is substantially proportional to a time derivative of the displacement of the craft from the given path of travel.

13. In a navigational aid for dirigible craft, means for supplying a first signal which is a measure of the movement of the craft toward a predetermined path of travel, said signal-supplying means being of a character such that the signal supplied therefrom is of a noisy nature, means independent of said first signal-supplying means for providing a second signal substantially in leading phase quadrature with said first signal, means for combining said first and second signals to provide a third signal substantially proportional in magnitude to said first signal but of a phase which leads the phase of said first signal by a preselected amount, and means for smoothing said third signal, said smoothing means serving to lag the phase of said third signal by substantially the same amount as said preselected amount of lead, whereby said smoothed third signal is substantially both in phase with and in proportion to said first signal.

14. In a navigational aid for dirigible craft, means for supplying a first signal of a noisy character and substantially proportional to the displacement of the craft from a given path of travel, means independent of said first signal-supplying means for providing a second signal substantially in leading phase quadrature with said first signal, means for combining said first and second signals to provide a third signal substantially proportional in magnitude to said first signal but of a phase which leads the phase of said first signal by a preselected amount, and means for smoothing said third signal, said smoothing means serving to lag the phase of said third signal by substantially the same amount as said preselected amount of lead, whereby said smoothed third signal is substantially both in phase with and in proportion to said first signal.

15. The navigational aid of claim 14 wherein the noisy signal is substantially proportional to a time derivative of the displacement of the craft from the given path of travel.

16. The navigational aid of claim 15 further including differentiating means connected to receive the smoothed third signal for providing a fourth signal proportional to a time derivative of said smooth third signal.

17. In a navigational aid for dirigible craft, means for supplying a signal which is a measure of the movement of the craft toward a predetermined path of travel, said signal-supplying means being of a character such that the signal supplied therefrom is of a noisy nature, signal-smoothing means connected to receive the noisy signal and adapted to provide in its output a smoothed version of said signal, said signal-smoothing means serving to effect a lag in the phase of the noisy signal in a preselected amount, means independent of said signal-supplying means for providing a signal of a leading phase relative to the noisy signal, and means for combining said smoothed signal version with the lead signal, the magnitude and phase lead of the latter being such that its combination with said smoothed signal version results in a smooth output signal substantially both in phase with and in proportion to the noisy signal.

18. A navigational aid for dirigible craft, said aid comprising means for providing a signal of a noisy character and of a magnitude substantially proportional to the displacement of the craft from a given path of travel, means independent of the noisy displacement signal-providing means for advancing the phase of said noisy displacement signal, signal-smoothing means connected to receive said phase-advanced signal and provide in its output a smoothed version thereof, said signal-smoothing means effecting a phase lag sufficient substantially completely to offset said phase advance given the noisy displacement signal, differentiating means connected to receive the output of said signal-smoothing means for providing a signal proportional to a time derivative of said output, and means for algebraically combining said noisy displacement signal and said time derivative signal, whereby the craft will be caused to approach and thereafter follow said given path of travel provided that the craft is controlled in a manner to maintain the resultant signal output of the last-recited means substantially equal to zero.

19. A navigational aid for aircraft, said aid comprising means for providing a first signal of a noisy character and of a magnitude substantially proportional to the displacement of the craft from a prescribed path of travel, means independent of said first signal-providing means for supplying a second signal having substantially the same leading phase relation to the first signal as a time derivative of said first signal, means for combining said first and second signals to provide a third signal of a phase which leads the phase of said first signal by a preselected amount, signal-smoothing means connected to receive said third signal and adapted to provide in its output a smoothed version thereof, said signal-smoothing means serving to effect a lag in the phase of said third signal in an amount substantially equal to said preselected amount of phase lead, differentiating means connected to receive said output of the signal-smoothing means for providing a fourth signal proportional to a time derivative thereof, and means for algebraically combining said first and fourth signals whereby the craft will be caused to approach and thereafter follow said prescribed path provided that the craft is controlled in a manner to maintain the resultant signal output of the last-recited means substantially equal to zero.

20. A navigational aid for aircraft, said aid comprising means for providing a first signal proportional to the displacement of the craft from a prescribed flight path, means for providing a second signal proportional to deviations in direction of the craft from the direction of said flight path, servomechanism means comprising an amplifier and including signal generating means adapted to supply position feedback and speed feedback signals to said amplifier, said first and second signals being connected in input relation to said amplifier, the relative magnitudes of said second signal and said speed feedback signal being such that the latter signal effects a smoothing of said first signal while the second signal simultaneously serves to maintain said speed feedback signal substantially in leading phase quadrature with respect to said first signal, and means for algebraically combining the first and speed feedback signals, whereby the craft will be caused to approach and thereafter follow said flight path provided that the craft is controlled in a manner to maintain the resultant signal output of the last-recited means substantially equal to zero.

21. The navigational aid of claim 20 further including means for providing a third signal proportional to deviations of the craft from a given roll attitude, said third signal being algebraically combined with the first and speed feedback signals in the combining means.

22. A navigational aid for aircraft, said aid comprising means for providing a first signal proportional to the displacement of the craft from a prescribed altitude, means for providing a second signal proportional to deviations in the pitch attitude of said craft, servomechanism means comprising an amplifier and including signal generating means adapted to supply position feedback and speed feedback signals to said amplifier, said first and second signals being connected in input fashion to said amplifier, the relative magnitudes of said second signal and said speed feedback signal being such that the latter signal effects a smoothing of said first signal while the second signal simultaneously serves to maintain said speed feedback signal substantially in leading phase quadrature with respect to said first signal, and means for algebraically combining the first and speed feedback signals, whereby the craft will be caused to approach and thereafter fly at said prescribed altitude so long as the craft is controlled in a manner to maintain the resultant signal output of the last recited means substantially equal to zero.

23. The navigational aid of claim 22 further including means for algebraically adding a portion of the second signal to the combined first and speed feedback signals, the amount of said portion depending on the extent the craft must deviate from a given pitch attitude in order to maintain the algebraic sum of said first and speed feedback signals equal to zero.

24. In a dirigible craft navigation system of the character described, means for providing a first signal proportional to the displacement of the craft from a chosen flight path, differentiating means for providing a second signal proportional to a time derivative of said first signal, gyroscopic means including a signal source for providing a plurality of third signal components proportional to the angular deviation of the craft from a reference attitude, first amplifier means for algebraically combining one of said third signal components and said first and second signals, means connected to receive the resultant signal output of said first amplifier means for limiting said signal output to a predetermined maximum value, and second amplifier means connected to receive another of said third signal components and algebraically combine said other component with the signal output of said limiting means whereby at least part of the third signal is eliminated from the signal output of said second amplifier means.

25. The navigation system of claim 24 wherein the first amplifier and the limit means effect a single phase reversal of the third signal component supplied thereto.

26. The navigation system of claim 25 further including means for adjusting the relative levels of the third signal components.

27. In a dirigible craft navigation system of the character described, means for providing a first signal proportional to the displacement of the craft from a chosen flight path, first differentiating means for providing a second signal proportional to the first time derivative of said first signal, second differentiating means for providing a third signal proportional to the second time derivative of said first signal, gyroscopic means including a signal source for providing a fourth signal proportional to the angular deviation of the craft from a reference attitude, first amplifier means for algebraically combining said first signal and a given portion of said fourth signal with at least one of said second and third signals, limiter means connected to receive the resultant signal output of said first amplifier means, said limiter means serving to limit said resultant signal to a predetermined maximum value, and second amplifier means connected to said fourth signal source and to said limiter means for algebraically combining the signal outputs thereof thereby substantially to cancel said fourth signal from the signal output of said second amplifier means so long as said resultant signal output of said first amplifier means is less than its said predetermined maximum value.

28. In an aircraft navigation system of the character described, the combination comprising means for providing a first signal proportional to the displacement of said craft from a prescribed flight path, differentiating means for providing a second signal proportional to a time derivative of said first signal, means for providing a third signal of leading phase with respect to said second signal, a servomechanism comprising a first amplifier connected to receive said second and third signals as inputs and including signal-generating means for providing position feedback and speed feedback signals to the first amplifier, said feedback signals being proportional respectively to the rate and acceleration of change of said flight path displacement of the craft, and second amplifier means connected to receive said feedback signals as inputs and algebraically combine them with said first signal, whereby the craft will intercept and thereafter travel along said flight path so long as the craft is controlled to maintain the algebraic combination of signals in said second amplifier means substantially at zero.

29. In a dirigible craft navigation system of the character described, the combination comprising a radio receiver means for providing a first signal proportional to the displacement of the craft from a radio-defined path, differentiating means for providing a second signal proportional to the first time derivative of said first signal, means including an accelerometer for providing a third signal proportional to accelerations of the craft along an athwartships axis thereof, means including a vertical gyroscope for providing a fourth signal proportional to deviations in the roll attitude of the craft, a servomechanism comprising a first amplifier connected to receive said second, third and fourth signals as inputs and including signal-generating means for providing position and speed feedback signals to said first amplifier, and second amplifier means connected to receive said position and speed feedback signals as inputs and algebraically to combine said signals with said first signal, whereby the craft will be caused to intercept and thereafter to travel along said radio-defined path so long as the algebraic combination of signals in said second amplifier means is maintained substantially at zero.

References Cited in the file of this patent

UNITED STATES PATENTS 2,507,304 Hofstadter ------------- May 9, 1950

(Other references on following page)

UNITED STATES PATENTS

| | | |
|---|---|---|
| 2,548,278 | Wirkler | Apr. 10, 1951 |
| 2,592,173 | Noxon et al. | Apr. 8, 1952 |
| 2,613,350 | Kellogg | Oct. 7, 1952 |
| 2,613,352 | Kellogg | Oct. 7, 1952 |
| 2,632,142 | Chenery | Mar. 17, 1953 |
| 2,634,925 | Kutzler | Apr. 14, 1953 |
| 2,643,354 | MacCallum et al. | June 23, 1953 |

FOREIGN PATENTS

| | | |
|---|---|---|
| 516,567 | Great Britain | Jan. 5, 1940 |